June 4, 1963 H. H. BOYD 3,092,007
VENTILATING SYSTEM FOR BULK CARRIERS
Filed Sept. 13, 1960
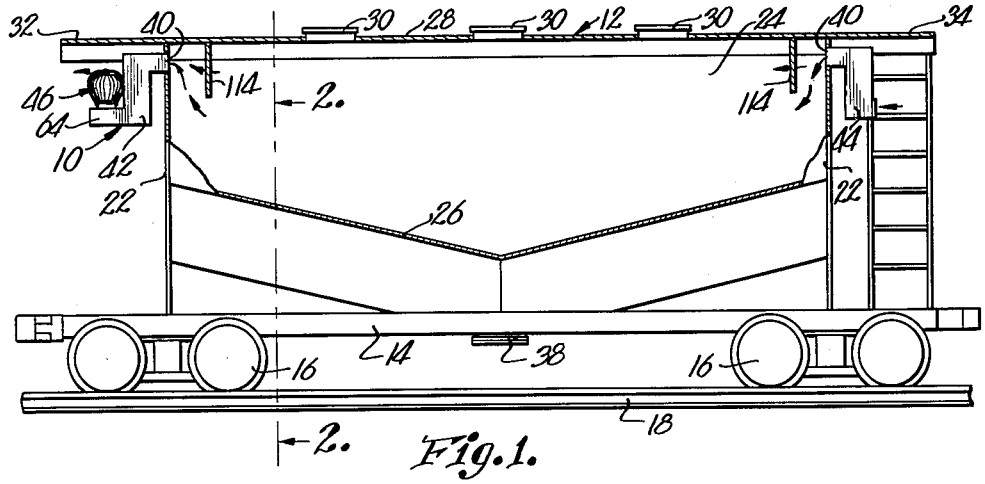
Fig. 1.
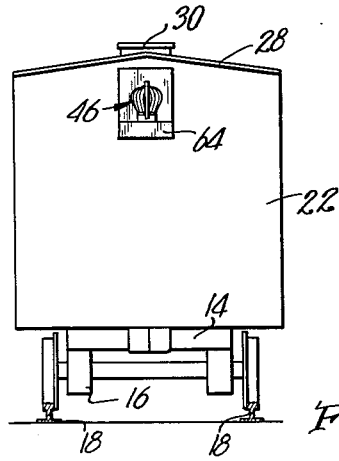
Fig. 3.
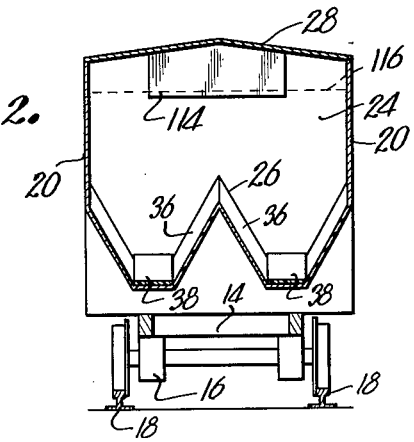
Fig. 2.
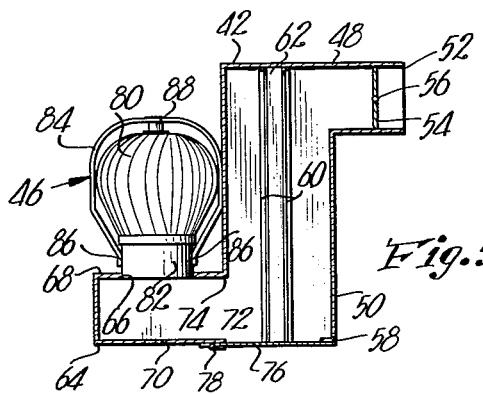
Fig. 5.
Fig. 4.
INVENTOR.
Halbert Houston Boyd
BY
Hovey, Schmidt, Johnson & Hovey
ATTORNEYS.

United States Patent Office 3,092,007
Patented June 4, 1963

3,092,007
VENTILATING SYSTEM FOR BULK CARRIERS
Halbert Houston Boyd, Kansas City, Mo., assignor to Seaboard Allied Milling Corporation, Kansas City, Mo., a corporation of Massachusetts
Filed Sept. 13, 1960, Ser. No. 55,687
4 Claims. (Cl. 98—6)

This invention relates to ventilating systems and, more particularly, to ventilating systems for carriers capable of transporting bulk material from a loading site to a dumping site.

Bulk material, such as flour, grain and seed, is most advantageously conveyed over long distances in large, enclosed bulk carriers such as railroad cars, barges, trucks or the like, since such a method precludes the packaging of the materials prior to the movement thereof by the carrier. However, the bulk carrier method of transporting materials of the above mentioned types poses the problem, especially with those materials capable of absorbing moisture, of removing the moisture from the interior of the carrier, which moisture is created by the evaporation of moisture within the materials during transit. The moisture content of flour, for instance, is normally about 14% by weight when the same is initially loaded into a carrier and the same may occupy a space having an upper level several feet above the level reached by the flour after settling by vibration in transit. This shrinkage of the material is accompanied by expulsion of moisture laden air from within the material and naturally occurs to a greater or lesser degree depending upon the atmospheric conditions.

If the moisture laden air is allowed to remain above the materials level in the carrier the moisture in the air eventually condenses on the walls of the carrier and gravitates toward the bottom of the carrier and in so doing contacts the materials to form a "dough line" which is a caked mixture of materials and water adhering to and encircling the inner walls of the carrier, thus producing an environment conducive to fermentation, mold growth and eventual putrification. Such a mixture remains on the walls as the material is removed from the carrier, resulting in a loss of materials and, furthermore, requiring that effort be expended to remove the "dough line" from the interior of the carrier prior to subsequent use thereof.

The instant invention circumvents the afore-mentioned problems by providing a means for ventilating a carrier of the character described utilizing a draft-creating means for circulating air through the carrier responsive to the movement of atmospheric air relative to the carrier.

Accordingly, it is the primary object of this invention to provide a means for removing moisture-laden air from the interior of a bulk carrier loaded with a bulk material to prevent the condensation of the moisture within the carrier and the eventual loss and contamination of a portion of the bulk materials due to the mixture thereof with the condensed moisture.

Another important object of the present invention is the provision of a means for ventilating a bulk carrier containing bulk materials to prevent the formation of a "dough line" within the carrier during transit of the materials by the latter.

Another important object of the instant invention is the provision of a draft-creating device mounted on the carrier which produces an air pressure differential at openings in opposed ends of the carrier to circulate air through the latter and thereby remove moisture-laden air therein.

Other important objects of this invention relate to the provision of a rotary turbine vent responsive to slight movements of air relative to the carrier for creating a draft through the latter; to the provision of an L-shaped duct means at opposed ends of the carrier for forcing the circulating air to follow a substantially serpentine path and thereby prevent the entrance of dust and precipitation within the carrier; to the provision of filter means within the ducts for filtering and purifying the air circulating through the carrier; and to the provision of valve means in the ducts for preventing the escape of materials through the ducts during the loading of the materials into the carrier.

In the drawings:
FIGURE 1 is a side elevational view of an embodiment of the instant invention used in conjunction with a railroad bulk carrier, parts being in section to reveal details of construction;
FIG. 2 is a sectional view taken along line 2—2 of FIG. 1;
FIG. 3 is an end elevational view of the carrier illustrated in FIG. 1, showing the rotary draft-producing device mounted thereon;
FIG. 4 is an enlarged, cross-sectional side elevational view of the duct means mounted on one end of the carrier and forming a part of the instant invention; and
FIG. 5 is an enlarged, cross-sectional, side elevational view of the duct means and rotary draft-producing device mounted on the other end of the carrier.

The ventilating system which is the subject of this invention is broadly denoted by the numeral 10 and, as illustrated in FIGS. 1 to 5 inclusive, is utilized with a conventional railroad commodity carrier 12, although it is clear that the same may be utilized with barges, trucks or other bulk commodity carriers.

Carrier 12 is comprised of a base 14 supported at opposed ends thereof by wheel and axle assemblies 16 operably coupled thereto, it being noted that the wheels engage spaced tracks 18 in the usual manner. Carrier 12 is further provided with a pair of spaced side walls 20 and a pair of spaced end walls 22, walls 20 and 22 being disposed uprightly on base 14 to provide a materials-receiving space 24 along with a bottom 26. A top 28 is secured to the upper margins of walls 20 and 22 to enclose space 24 and is provided with a plurality of inlets 30 through which bulk materials may pass as the same are directed into space 24. Top 28 is further provided with a pair of lateral extensions 32 and 34 projecting outwardly from respective end walls 22 for a purpose hereinafter described. Bottom 26 includes a pair of transversely V-shaped troughs 36 spanning the distance between end walls 22 and secured to the latter, it being noted that troughs 36 incline downwardly as the center of carrier 12 is approached. At the center of carrier 12 or at the lowermost point of each trough 36 an outlet 38 is disposed in trough 36 to permit the removal of bulk materials in space 24 from carrier 12. It is to be noted that inlets 30 and outlets 38 are provided with suitable closures to completely enclose space 24.

End walls 22 are each provided with an opening 40 therethrough proximal to the upper margin thereof and spaced below top 28. Openings 40 provide access means for air circulating through space 24 and thereby form a part of ventilating system 10.

Secured to end wall 22 below extension 32 is an L-shaped duct means 42 and secured to end wall 22 below extension 34 is an L-shaped duct means 44, duct means 42 and 44 being disposed exteriorly of space 24. Secured to duct means 42 and spaced from the respective end wall 22 is a draft-producing device 46, it being noted that duct means 42 and draft-creating means 46 are disposed beneath extension 32.

Duct means 42 is provided with a tubular first stretch 48 and a tubular second stretch 50 integral with first stretch 48 and extending laterally therefrom. First stretch 48 is provided with an open end 52 which is secured to end wall 22 in any suitable manner and disposed over opening 40 in end wall 22 in closing relationship to opening 40. Duct means 42 is constructed, preferably, of a rigid metallic material and it is conceivable that first stretch 48 may be secured to end wall 22 as by welding. A manually operated butterfly valve 54 is disposed within first stretch 48 and spaced inwardly from the open end 52 thereof to prevent the escape of bulk materials from space 24 when the latter is being filled through inlets 30. Valve 54 is rotatable about an axis 56 by means of a hand crank (not shown). As is clear in FIG. 5, valve 54 is in the closed position.

Second stretch 50 conforms in transverse cross section to first stretch 48 and, when duct means 42 is mounted on the respective end wall 22, second stretch 50 depends from first stretch 48 and is spaced horizontally from the respective end wall 22. In the embodiment of duct means 42 illustrated in the drawings the transverse cross section of first and second stretches 48 and 50 is rectangular, stretches 48 and 50 having a pair of opposed sides and a pair of opposed walls joining the sides. Second stretch 50 is provided with an open end 58 defined by the lowermost margins of the sides thereof. Disposed within second stretch 50 and extending the length thereof is a pair of elongated guides 60 on each of the walls joining the sides of second stretch 50 within the latter, as is clear in FIG. 5. Guides 60 are adapted to maintain an elongated filter 62 in a fixed position when end 58 of second stretch 50 is closed.

Secured to stretch 50 proximal to the lowermost end thereof and in partial communication with open end 58 thereof is a hollow element 64 having an opening 66 in the top 68 thereof. The bottom 70 of element 64 is provided with a margin 72 spaced below the attachment point 74 of element 64 with second stretch 50 and spaced horizontally from the side of second stretch 50 opposite to the side attached at point 74. Opening 58 is further closed by a filter access door 76 swingable about a substantially horizontal axis 78 on margin 72 of element 64. Suitable fastening means secures door 76 in closing relationship to end 58. Filter 62, when inserted in second stretch 50 between guides 60 thereon, is supported by door 76, as is clear in FIG. 5. In this position filter 62 is disposed substantially across the opening formed by margin 72 and point 74. Air passing through this opening must first pass through filter 62 in order to circulate through first stretch 48 and end 52 thereof.

Draft-creating means 46 is comprised of a slotted turbine vent 80 rotatably mounted on a tubular base 82 about a substantially vertical axis passing through the center of vent 80 and base 82. A substantially U-shaped ring 84 is secured to base 82 at opposed points 86 thereon and extends above and around vent 80 to provide a support means for a bearing 88 rotatably mounting the uppermost portion of vent 80. Base 82 is secured to top 68 of element 64 in communication with opening 66 of the latter. It is clear that open end 52 of first stretch 48, and thereby opening 40 in the respective end wall 22, is in communication with the atmosphere surrounding carrier 12 by virtue of the air passage formed by first stretch 48, filter 62, second stretch 50, element 64, base 82 and slotted vent 80.

It is to be noted that vent 80 is rotatable responsive to the movement of air relative to duct means 42 and the same requires no motive power for rotation thereof. It is further to be noted that a very slight movement of air is necessary to rotate vent 80 so that the same is operable even during the time when carrier 12 is at rest. As vent 80 rotates, a vacuum is produced within vent 80 by virtue of the venturi effect of the air passing by and rotating vent 80, which vacuum effectively reduces the air pressure at opening 40 relative to the interior of carrier 12 so that air within space 24 is caused to pass into duct means 42 and out through the slots in vent 80.

Duct means 44 is mounted on end wall 22 opposite to end wall 22 below extension 32 and is comprised of a first stretch 90 and a second stretch 92 integral with and depending from first stretch 90. First stretch 90 is provided with an open end 94 secured to the respective end wall 22 in any suitable manner and the same is disposed over the respective opening 40 in closing relationship to the latter. First stretch 90 is provided with a butterfly valve 96 rotatable about a substantially horizontal axis 98 and, as illustrated in FIG. 4, valve 96 is in the open position.

Second stretch 92 is provided with an open end 100 formed by the lowermost margins of the sides thereof, end 100 being closed by an elongated grill 102 depending from one side of second stretch 92 and a swingable filter access door 104 swingable about a substantially horizontal axis 106 on stretch 92 and secured to the lowermost extremity 108 of grill 102 by any suitable releasable means. A filter 110 is disposed within second stretch 92 in the same manner as filter 62 within duct means 42. Filter 110 is retained within second stretch 92 by virtue of a pair of elongated guides 112 mounted on opposed inner walls of stretch 92 and filter 110 is supported by door 104 so that the same is effectively disposed across opening 100 defined by grill 102. It is clear that open end 94, and thereby the respective opening 40, is in communication with the atmosphere surrounding carrier 12 by virtue of the air passage formed by first stretch 90, filter 110, second stretch 92 and grill 102.

An elongated baffle 114 depends from top 28 proximal to each opening 40 in walls 22 to force air entering or leaving openings 40 to pass around and down from the line joining openings 40 in end walls 22. Air is then deflected to all parts of space 24 so as to effectively ventilate the latter.

When carrier 12 is loaded with a bulk material through inlets 30 to a level defined by the broken line 116 of FIG. 2 air is permitted to circulate through the space defined by top 28 and line 116 by passing around both vertical margins of each baffle 114. When air flows past vent 80 and relative to carrier 12 the air pressure at opening 40 below extension 32 decreases relative to the air pressure at opening 40 below extension 34. This air pressure differential causes air in the space between top 28 and level 116 to flow towards opening 40 below extension 32 and out through duct means 42 to the slots in vent 80. Removal of air through duct means 42 causes air surrounding carrier 12 to enter duct means 44 and the respective opening 40 to equalize the pressure in the interior of carrier 12. It is evident that rotation of vent 80 will provide air circulation through the interior of carrier 12 so as to remove any moisture-laden air therewithin caused by the evaporation of moisture from the bulk materials therein contained. It is further to be noted that carrier 12 may either be stationary or in motion in order to cause air to be circulated therethrough. If carrier 12 is stationary, the slightest wind past vent 80 will set up this circulation of air through carrier 12 and, of course, when carrier 12 is in motion, the same moves relative to the air to thereby cause vent 80 to be set into motion.

The construction of system 10 provides that extensions 32 and 34 substantially overlie duct means 42 and 44 and the draft-creating device 46 mounted on duct means 42. This effectively prevents precipitation such as rain and snow from contacting duct means 42 and 44 and draft-creating means 46 and, further, prevents precipitation from entering within carrier 12.

If a slight amount of precipitation does enter within the slots of vent 80, the same is trapped in the bottom of element 64 and prevented from passing through opening 40 in the respective end wall 22 by virtue of the L-shape of duct means 42. Similarly, dust or precipitation passing through grill 102 of duct means 44 is prevented from passing through the latter and into the respective opening 40 by virtue of the L-shape thereof.

The construction of second stretch 50 and second stretch 92 of duct means 42 and 44, respectively, permits the use of large filters 62 and 110, which reduce the resistance to air movement through the respective ducts and thereby permit the use of a finer mesh filter to more effectively purify the air passing therethrough.

System 10 therefore provides a ventilating means for removing moisture-laden air created by moisture evaporated from the bulk materials within space 24 so that moisture is prevented from condensing on the walls of the interior of carrier 12 to gravitate into contact with the material proximal to level 116 thereof. This ventilating action further prevents the formation of a "dough line" which reduces somewhat the amount of materials delivered to the destination point and which requires that additional effort be expended to remove the dough line at the destination prior to subsequent use of carrier 12. For sanitary reasons this dough line must be removed before the carrier can be filled again. It is further evident that, by the removal of moisture from the space between top 28 and level 116, the condensation of the moisture is prevented and the subsequent deterioration of the interior surfaces of carrier 12 is prevented, which over a period of time amounts to a great saving in materials handling equipment.

Having thus described the invention what is claimed as new and desired to be secured by Letters Patent is:

1. In a bulk carrier, an enclosure provided with a top and a pair of opposed end members each having an opening therethrough, said enclosure being adapted to contain therein a bulk material having an uppermost level spaced from said top and below said openings; means on said members at the openings in the latter for intercommunicating the space between the top and said uppermost level with the atmosphere surrounding the enclosure; said intercommunicating means on each of said members including an L-shaped duct having a first tubular section mounted on the corresponding member and a second tubular section connected to the first section and depending therefrom in spaced relationship to the respective member, said first section having an open end communicating with the opening in the member and said second section having an opening therein spaced from the connection thereof with said first section; and means responsive to movements of atmospheric air relative to the enclosure for providing an air pressure differential between the openings in said members, said last mentioned means comprising an open top, hollow element, secured to the second section of the duct on one of said members and in communication with the opening in said second section and a turbine vent mounted on said element and in communication with the opening in the top thereof.

2. A bulk carrier as set forth in claim 1 wherein is included valve means in said first section proximal to the open end thereof to control the flow of air therethrough and means in said second section across the opening therein for filtering the air passing through said duct.

3. A bulk carrier as set forth in claim 1 wherein said turbine vent is rotatable about a substantially vertical axis.

4. In a bulk carrier, an enclosure provided with a top and a pair of spaced end members each having an opening therethrough, said enclosure being adapted to contain therein a bulk material having an uppermost level spaced from said top and below said openings; means mounted on said members exteriorly of the enclosure and operably coupled with said openings in said members for intercommunicating the space between the top and said uppermost level with the atmosphere surrounding the enclosure, said means comprising an L-shaped duct for each member and secured thereto proximal to the opening therein, each of said ducts including a first tubular section extending outwardly from said member and a second tubular section depending from the outer end of said first section in spaced relationship to the respective member, said first section having an open end communicating with the opening in the member and said second section having an opening spaced below said first section; valve means in said first section for controlling the flow of air therethrough; filter means in said second section across the opening therein for filtering impurities from air passing therethrough; and means responsive to movements of atmospheric air relative to the enclosure for providing an air pressure differential between said openings, said last mentioned means comprising an open top hollow element secured to the second section of the duct on one of said members and in communication with the opening of said second section and a slotted turbine vent rotatably mounted on said element in communication with the opening in the top thereof for decreasing the air pressure at the opening in said one member relative to the air pressure at the opening in said other member, whereby air is caused to circulate through said space when the enclosure is moved relative to the air proximal thereto.

References Cited in the file of this patent
UNITED STATES PATENTS

| | | |
|---|---|---|
| 261,920 | Gouge | Aug. 1, 1882 |
| 657,743 | Miller | Sept. 11, 1900 |
| 2,272,143 | Wigney | Feb. 3, 1942 |
| 2,338,363 | Stobell | Jan. 4, 1944 |
| 2,856,838 | Mack | Oct. 21, 1958 |